Patented Sept. 17, 1946

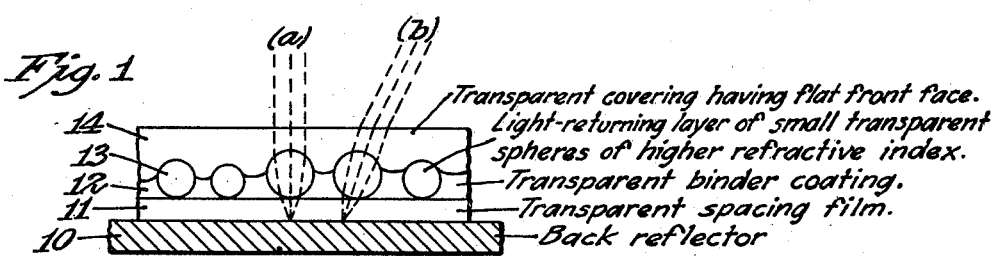
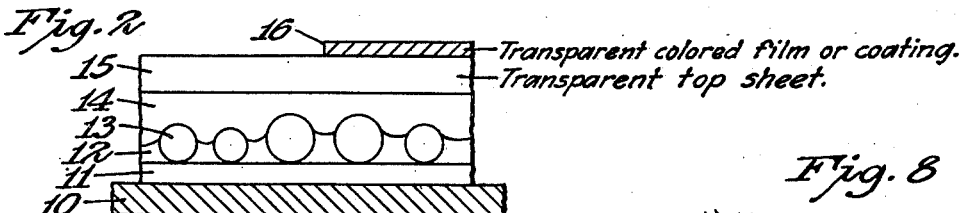
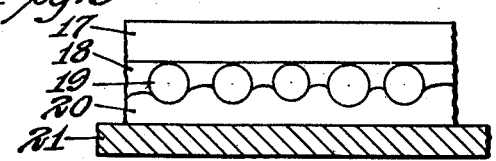
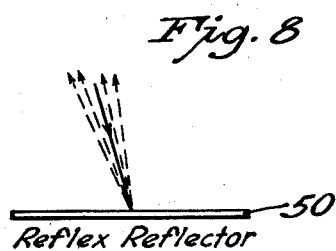
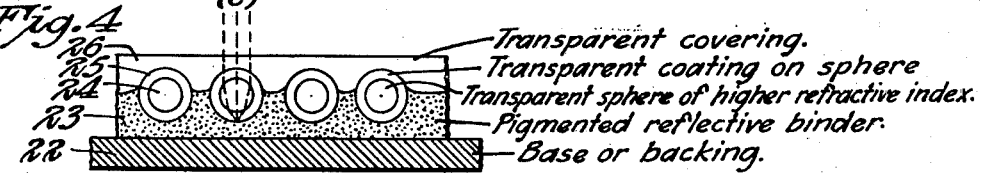
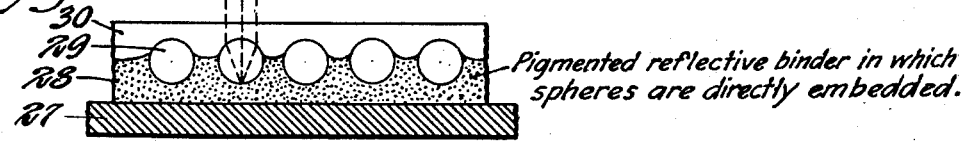
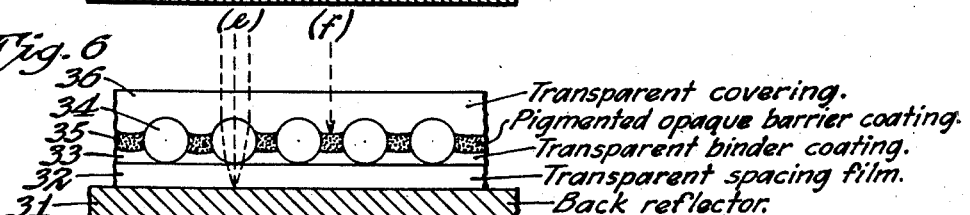
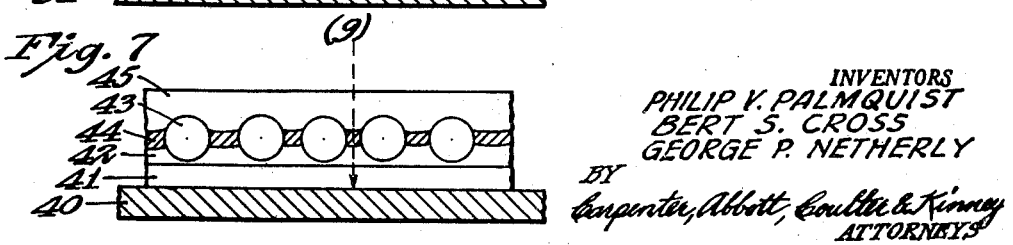

2,407,680

UNITED STATES PATENT OFFICE 2,407,680

REFLEX LIGHT REFLECTOR

Philip V. Palmquist, New Canada Township, Ramsey County, and Bert S. Cross and George P. Netherly, St. Paul, Minn., assignors to Minnesota Mining & Manufacturing Company, St. Paul, Minn., a corporation of Delaware Application March 2, 1945, Serial No. 580,590

24 Claims. (Cl. 88—82)

This invention relates to reflex light reflectors of the class in which a light-returning layer of small transparent spheres is associated with light-reflecting means underlying the spheres in optical connection with the back extremities thereof; so that a beam of light incident on the front of the sphere layer is refracted and reflected in such manner that a brilliant cone of light is selectively returned toward the light source, even though the incident beam strikes at an angle (see Fig. 8). The characteristic of such a reflector in returning back a brilliant cone of light toward the source of an angularly incident beam of light, gives rise to the term "reflex" reflector, to distinguish from mirrors which cause specular reflection, and from diffusing types of reflective surfaces which dissipate the incident light in all directions without selective return in the direction of incidence. Road signs and markers of the reflex type have greater visibility at night than do ordinary signs and markers, to the occupants of an approaching vehicle, because less of the reflected light is dissipated outside of the field of viewing, the reflected light being concentrated in a narrow cone which automatically returns toward the headlights and occupants of the vehicle.

Heretofore, reflex light reflectors of the class above described have had a beaded or lenticular front face formed by the exposed convex spherical front extremities of the spheres projecting beyond the binder material which holds them in place.

Use has sometimes been made of a transparent film or plate which is placed over the front face of the lenticular surface. Such an accessory does not alter the lens action of the spheres, since the latter still contact air at the front surfaces thereof and thus the refracting of light at each front sphere surface is not interfered with. The use of such an overlying transparent film or plate has been proposed to protect the underlying structure from the weather, or to serve as a colored light filter. The necessity of including the interposed layer of air makes for complications. It is difficult to seal the edges to keep out moisture and dirt. Moreover, if the plate is stiff and brittle (as is true of a glass pane) there is danger of breakage and there are further obvious complications in making up signs and markers, and the composite structure cannot be supplied as a unified sheet material in roll form. If a flexible film is used, it will not maintain a smooth and unwarped condition and it can be ripped off by vandals, due to lack of unification to the sphere surfaces. These combinations have, therefore, been of limited practical value, due essentially to the necessity of providing air in contact with the front sphere surfaces.

In some instances a transparent coating has been applied directly over the layer of spheres, to provide weather protection or to serve as a color filter; but such a coating has had to be thin and conform on its front (outer) face to the underlying spherical surfaces to provide an approximately corresponding lenticular surface. Otherwise the desired lens action would be nullified since such transparent coatings have refractive indices approximating that of the ordinary glass which has been employed in making the spheres. Spheres are commonly used which have a diameter of the order of 10 mils or less and only a thin coating can be used for the described purposes; as the application of a relatively thick coating would not produce an outer surface of the necessary lenticular type. Thin coatings conforming to the sphere surfaces have not been of much practical value in making reflex reflectors adapted for extended outdoor use, due to poor weather-resistance and the alteration occurring in the shape of the convex outer film surface over each sphere, causing interference with the desired lens action of such surface.

Reflex reflectors having beaded or lenticular front surfaces formed by a layer of small spheres, have certain undesirable characteristics. Among these are the following: Rain, spray and fog results in water contacting the lenticular surface so as to change the light-refracting action and thereby markedly reduce the reflex reflecting action and the night visibility of signs and markers in which the reflex reflectors are embodied. A layer of water covering the lenticular surface almost or entirely destroys the reflex reflecting action and thus "blacks out" the sign or marker if the illumination is insufficient to otherwise make it visible. The smaller the spheres the greater the difficulty. Direct exposure of the outer extremities of the spheres places a limitation on the kinds of material which can be used in making the spheres. For example, the sphere material cannot be soft, fragile or lacking in waterproofness, as outdoor exposure would result in damaging the front extremities of the spheres and altering their lens characteristics. Also, the bond between the binder and the spheres is exposed at the front juncture edges, thus allowing moisture to work in and weaken the bond unless the binder material is especially chosen to minimize this effect, which places a limitation on the kinds of binder compositions which can be used in making weatherproof reflex reflector sheets, signs and markers.

The present invention provides a novel type of physical and optical structure which overcomes all of the above-mentioned difficulties and also has further features which are of value in connection with various uses of reflex reflector sheet material, signs and markers, as will be indicated more fully hereinafter.

Briefly stated, the present novel type of reflex light reflector structure utilizes a continuous transparent solid covering which overlies and is integrally united to the layer of small transparent spheres, conforming to the front extremities of the spheres in unified relation. The outer or front face of this covering is flat and thus provides a continuous flat front surface overlying the layer of small spheres. The spheres are sealed in, out of contact with the atmosphere.

To make this structure optically effective to produce the desired reflex reflector action, use is made of transparent spheres having a refractive index at least 1.15 times the refractive index of the overlying contacting transparent covering, and preferably at least about 1.3 times as great. The spacing relation of the back reflector which underlies the spheres, to produce optimum reflex-reflection brilliancy, is determined by this refractive index ratio rather than merely by the refractive index of the spheres per se. For a refractive index ratio of 1.15, optimum brilliancy is obtained with a back spacing distance approximating the sphere diameter (i. e. the distance between the back reflective surface and the back extremity of a sphere is approximately equal to the diameter of the sphere). This spacing distance ratio decreases as the refractive index ratio increases, and approaches zero as the latter approaches 1.9. This assumes that the transparent material lying between the back reflective surface and the back extremity of the sphere, has approximately the same refractive index as the transparent covering which contacts the front extremity of the sphere; which need not, however, be the case, although a variation will alter the optimum spacing distance ratio. Nor, in order to obtain a useful reflex reflector, is it necessary to use a spacing distance ratio adapted to produce optimum reflex reflecting brilliancy; and spacing may be omitted when higher refractive index ratios are used, even though less than 1.9. These points will be discussed in more detail later.

The invention provides weatherproof reflex reflector sheet material which may be manufactured in continuous web fashion and supplied to users in roll form, for ready cutting into desired shapes and sizes and application to any desired base or backing, in the making of outdoor signs and markers. A tough, pliable film type of sheet can be made, having a wide variety of uses, and which need not be combined with a base or backing. The reflex reflector structure may, however, be made up in the course of making a sign or marker by applying a suitable succession of coatings or layers to the rigid base or backing, but this procedure will generally be less convenient than utilizing preformed flexible reflex reflector sheet material. Various illustrative uses of the reflex reflector sheet material will be subsequently indicated in more detail.

The invention also provides transparent optical sheets which may be attached to reflective surfaces to produce reflex reflection of incident beams of light. Such an optical sheet is, in effect, a sub-combination of the self-reflecting reflex reflector described above, the integral back reflector being omitted. When applied to a reflective surface there then results a complete reflex reflector combination.

A more detailed description of the invention and its principles and features can best be presented in connection with the following description of the accompanying drawing, wherein:

Figs. 1 to 7, inclusive, are highly magnified diagram views showing the structures of seven different reflex reflectors embodying the invention.

Fig. 8 shows in diagram form a reflex reflector and the concentrated cone of reflex-reflected light returning toward the source of an angularly incident ray or beam which produces it.

These diagrammatic drawings of Figs. 1 to 7 are not literal section views, since the spheres are spaced farther apart than is customary, and each circle represents a full circumference as though the spheres were arranged in rows, whereas in general they are actually packed such as results from sprinkling an excess of spheres on a surface (although for some purposes it may be desirable to employ fewer than the maximum number of spheres and in such a case there would be spacing between the spheres depending on the quantity used).

Referring to Fig. 1, there is shown a reflex reflector structure having an underlying flat back reflector 10 which has a light-reflective face. Bonded to the reflective face thereof is a transparent spacing film 11, over which is bonded a transparent binder coating 12 in which a light-returning layer of small transparent spheres 13 is partially embedded, so that the back extremities of the spheres touch or closely approach the underlying spacing film and the front extremities project beyond the binder coating. The spacing film and binder coating constitute a transparent matrix which holds the spheres in fixed position and in definite predetermined uniform spaced relation to the underlying back reflector. Thus far the described physical structure is of the same general type which has been employed in prior reflex reflectors of the spaced kind (cf. Heltzer and Clarke Patent No. 2,354,018, and Palmquist Patent No. 2,354,049, both issued on July 18, 1944).

Overlying the layer of spheres and binder coating is a transparent solid covering 14 which has a flat front (outer) face and which conforms to the underlying surface of the spheres and binder and is united thereto, thereby sealing in the layer of spheres and excluding atmospheric contact therewith. The spheres are thus surrounded in front and back by transparent solid material, and the front face of the reflex reflector is flat and not lenticular.

The spheres have a refractive index substantially higher than that of the transparent covering, which is essential to their proper functioning as convex lens elements to cause the necessary bending of incident and emergent light rays which, in combination with the reflective action of the back reflector on the light rays passing through the spheres, results in the desired reflex reflecting characteristic of the reflector sheet.

Consider first the simplest case wherein the spheres are surrounded by optically homogeneous transparent media of uniform refractive index (i. e. the spacing film 11, binder 12, and covering 14, have substantially identical refractive indices). The combined refracting and reflecting actions are shown by the paths of parallel incident rays indicated in Fig. 1. The paraxial rays $a$, striking the front face perpendicularly (zero angle of incidence), penetrate the transparent covering 14 without bending and then strike the front of the transparent sphere, and are bent inwardly towards the central or axial ray so as to converge in passing to the back of the sphere (due to the higher refractive index of the sphere). In passing from the back of the sphere into the underlying transparent medium, the convergent rays are again bent inwardly so as to further increase the degree of convergence (again due to the higher refractive index of the sphere), and when they strike the surface of the underlying back reflector 10 the rays will all be near the point where the central axis intersects said surface. If the sphere is spaced from the back reflector the proper distance, most of the rays will strike the back reflector very close together; although no spacing distance exists such that the rays can be brought together at a true focal point, even if the sphere should be perfect in a geometrical sense, due to optical spherical aberration which is very pronounced. The so-called optimum spacing distance is that which results in the rays incident on the back reflector forming a bright disk of the minimum possible apparent diameter; this diameter being quite small relative to the diameter of the sphere, and hence in a loose sense this disk may be called a "point."

The convergent cone of rays striking the back reflector causes the reflector to emit a divergent cone of rays. If the reflective surface is highly specular (i. e. a polished metal surface), and the aforesaid optimum spacing distance has been used, the emitted cone of rays will be approximately coextensive with the incident cone of rays. A non-specular diffusing type of reflective surface (such as a pigmented paint type) will emit a broader cone of rays and many will not be able to return through the sphere. The rays of the emitted (reflected) cone of rays striking the back of the sphere, are bent in by refraction at the sphere surface, reducing their degree of divergence, and this happens again when they pass from the front of the sphere into the covering, so that the reflected rays finally emerge from the front face of the covering with only a small angle of divergence from the axis. The rays do not emerge as a bundle of parallel rays, not only because of physical imperfections in any actual structure, but because optical spherical aberration has prevented a perfect point focus at the back reflector in any event. The rays returning to the light source comprise a concentrated cone of light. The divergency of this reflected cone of light can be increased by spacing the back reflector somewhat closer or farther than the aforesaid optimum spacing distance. This broadening out will be desirable when the observers may not be located close to the axis of the incident light beam, even though there is thus a sacrifice in the brilliancy as measured from a position close to the axis.

Fig. 1 also indicates the paths followed by angularly incident rays. The parallel rays $b$ are shown striking the front face of the covering at a substantial angle of incidence to the normal, and are bent in passing into the covering, so as to approach the sphere as parallel rays having a decreased angle of incidence to the normal (i. e. a smaller angle to a line perpendicular to the plane of the sheet). This decrease in the angle of incidence of the rays striking each sphere is an important feature of the present type of reflex reflector structure, which gives it an advantage over the ordinary type in which the incident rays directly strike each sphere. For example, if the transparent covering has a refractive index of 1.48, rays striking the flat front at an angle of 30° to the normal are refracted so as to approach the spheres at an angle of 20° to the normal; and hence the angularity effect is equivalent to that of the usual type of reflector when rays initially approaching at an angle of 20° directly strike the exposed spheres thereof. The brilliancy of the reflex reflector (as viewed from near the axis of an incident beam of light) decreases as the angle of incidence on the spheres increases (cf. the graphs presented in Palmquist Patent No. 2,294,930, issued on Sept. 8, 1942). Thus the present type of reflex reflector will maintain brilliancy of reflex reflection for larger angles of incidence and hence has better "angularity," on account of the refracting action of the transparent covering with its flat front.

The rays shown as $b$ strike the sphere and undergo refraction at both the front and back of the sphere, and converge on the back reflector, as previously described. The axis of the convergent incident cone of rays has an angle to the normal the same as the angle of the rays after entering the flat front of the covering which, as pointed out, is a smaller angle than the angle of incidence of the rays approaching the covering. The distance from the center of the sphere to the point where the axial ray strikes the reflector surface is made greater than the distance for the normal axial ray, on account of the angular incidence. Hence if the spacing distance between the sphere and back reflector is the optimum for normal rays, the sphere will be over-spaced as regards angularly approaching rays and these rays will in consequence not be so close to a point focus when they strike the reflector. For this reason it may be considered desirable to somewhat under-space the spheres from the back reflector as regards normal rays, in order that angularly incident rays may be brought to a better focus. This will improve the angular brilliancy of the reflex reflector, although at a sacrifice of brilliancy for light beams incident at zero angle or a small angle. The choice will depend on the use to which the particular reflex reflector is to be put.

The convergent cone of rays striking the back reflector surface causes the emission of a divergent cone of rays. A proportion of these emitted rays will not lie within or close to the angularly incident cone of rays and hence will not return back to the source. The ratio of "wasted" rays to returned rays depends on the angle of incidence to the reflective surface and on the type of reflective surface. A reflex reflector having a specular or semi-specular type of back reflector suffers a rapid decrease in reflex reflecting brilliancy as the angle of incident rays becomes large, and hence the present type of reflex reflector is especially advantageous in minimizing this result (due to the refracting action of the covering). Specular and semi-specular types of back reflectors produce the highest brilliancy for small angles of incidence and hence are desirable whenever maximum distance visibility is a major objective.

The emitted rays which lie approximately in the field of the incident cone of rays, proceed toward the light source, the degree of divergence of these rays being reduced by refraction at the back and at the front of the sphere, and the rays being bent on emerging into the air from the flat front of the covering. The returning rays from all of the spheres form a cone of light rays which diverge somewhat, as previously explained, so that a person off but near the axis of the beam of incident light will be within the brilliant cone of returning, reflex reflected, light. It is the phenomenon just described which gives rise to the reflex reflecting characteristic of the reflector structure (by which is meant the characteristic of returning toward the light source a brilliant cone of concentrated light even though the incident light beam approaches the reflector surface at an angle, as indicated in Fig. 8).

The aforesaid optimum spacing distance may be calculated in a simple way by assuming that it is the distance behind the sphere at which those convergent rays intersect the normal axis passing through the center of the sphere, which were initially parallel to the normal axis and separated from this axis by a distance equal to 0.575 times the radius of the sphere. This is an empirical rule that agrees with experimental results sufficiently closely to be useful in practice. The actual distance depends on the refractive index ratio. Elementary lens formulae (which ignore spherical aberration) cannot be employed to calculate a "focal distance" or position of a "focal point" from which to determine the optimum spacing distance with accuracy; since spherical aberration is actually very pronounced because of the use of the simple sphere lens elements of wide aperture.

The above-mentioned calculation yields the following values. The figures in the first column are values for refractive index ratio (refractive index of spheres divided by refractive index of the solid transparent material surrounding the spheres). The figures in the second column are the calculated spacing distances, expressed as percentages of sphere diameter.

| Refractive index ratio | Spacing distance (percent of sphere diameter) |
|---|---|
| | Per cent |
| 1.02 | 1000 |
| 1.05 | 395 |
| 1.10 | 180 |
| 1.15 | 110 |
| 1.20 | 80 |
| 1.30 | 45 |
| 1.40 | 28 |
| 1.50 | 18 |
| 1.60 | 11 |
| 1.70 | 6 |
| 1.80 | 3 |
| 1.90 | 0 |

The first three rows of figures are given to show why refractive index ratios of less than 1.15 are not useful. In such cases the required optimum spacing greatly exceeds the sphere diameter and is so great that there would be poor reflex-reflection brilliancy and very poor angularity when used. A lesser or greater spacing than the optimum would make the brilliancy even worse. A refractive index ratio of at least about 1.3 is preferred. Good results can be obtained without any spacing when the ratio is in the range of about 1.6–2.0, the optimum being approximately 1.9.

If a structure is employed in which the transparent material interposed between the back of the spheres and the back reflector, has a refractive index appreciably different from the refractive index of the transparent front covering, the optimum spacing distance will be altered on that account, due to the change in the degree of convergence of the rays approaching the back reflector surface. A decrease in the refractive index of the back transparent material will decrease the optimum spacing distance, and conversely an increase in refractive index will increase the optimum spacing distance.

In practice, the aforesaid so-called optimum spacing distance may be determined by observation, being that spacing distance which results in maximum brilliancy of reflex reflection as ascertained by an observer (or photo-electric cell) located close to the axis of a beam of light striking the reflex reflector at substantially zero angle of incidence. In commercial manufacturing practice where the spacing film is formed by applying a coating, it is the desirable coating weight (per unit area) which is the value to be determined, and this may be determined by trial and without actually measuring refractive indices and spacing distances. However, an understanding of principles involved and use of the above-mentioned calculation or data will permit of making up test samples which approximate to the optimum, the thickness of the spacing film produced per unit of coating weight being known. Thus time and effort can be saved in arriving at factory specifications.

In actual practice it may be desirable to deliberately depart from the aforesaid optimum spacing distance in designing a reflex reflector structure best suited to a particular use. Generally, this will involve somewhat under-spacing the spheres, for the purpose of improving "angularity" properties, and somewhat increasing the divergency of the light rays returned to the light source. Also, the small spheres will ordinarily not be of identical size, and under-spacing relative to average diameter will insure that fewer individual spheres are over-spaced.

The foregoing discussion is from the standpoint of securing the best possible results. It will be understood that the invention is not limited to reflex reflectors designed in this critical way. Useful reflex reflectors can be made even though there is a substantial departure. The invention embraces all those which utilize the basic structural principle herein described, involving use of the transparent covering for the spheres, which has a flat front face, the spheres having a refractive index at least 1.15 times that of the covering.

The back reflector 10 may be of any suitable type. It may be a stiff or rigid base having a reflective surface; a flexible backing (cloth, paper or a film) having a reflective coating; a metal sheet or foil having a reflective surface (such as aluminum foil); a reflective metallic coating deposited on the back surface of the spacing film by electro-deposition or by spraying; or a thin binder coating containing a reflective pigment. It may be bonded to the spacing film as the result of any suitable coating or lamination procedure to produce a reflex reflector structure having an integral back reflector. The back reflector need not be of a uniformly reflecting nature over its whole area. It may be formed by a printing, stenciling or painting process so that the surface presents desired insignia, designs or lettering, and certain areas may be non-reflective or black. The back reflector may constitute the surface of a sign or marker of any desired type, the night visibility of which is increased by the reflex reflecting action resulting from its combination with the overlying structure; without interference with its day visibility.

A highly specular (mirror type) of reflective surface, such as that of a silvery metallic coating or a smooth-surfaced aluminum foil, will produce the greatest long-range visibility for light incident at small angles, but the relatively poor angularity characteristic is a disadvantage for some uses. At the other extreme, a non-specular reflective surface, such as that of a paint or coating containing a diffusing pigment (i. e. titanium dioxide pigment, etc.) will produce the best angularity and will still have a considerable long distance visibility for small angles of incidence. An intermediate type is the metallic semi-specular reflective surface produced by an aluminum paint type of coating wherein the aluminum flakes lie approximately flat to the surface.

The transparent spacing film 11 may be a preformed film of suitable thickness or may be formed in situ by applying a layer of liquid coating composition in suitable amount, followed by drying or setting-up. The transparent binder coating 12 is applied over the spacing film, in the form of a liquid coating composition forming a layer of such thickness that the layer of subsequently applied spheres will be embedded about half way when pressed down in contact with the underlying spacing film. After drying or curing of the binder coating, the transparent covering 14 is formed by coating over the spheres and binder with a suitable liquid coating composition, the top surface being smoothed to result in a flat top face when the composition has been dried or cured.

By coloring the transparent spacing film, or transparent covering, or both, and using a white or silvery back reflector, a brilliant colored reflection can be obtained due to the high reflecting efficiency of white and silvery types of back reflectors. A suitable dye or transparent color pigment can be employed for this purpose.

Because of the sealed-in construction, the spheres may be made of substances which could not be otherwise employed. Transparent organic solid compositions of suitably high refractive index can be used. In general, inorganic types of glass are most useful and can more easily be made so as to have a high refractive index. Colored transparent spheres can be used in making colored reflex reflectors.

With respect to sphere size, the upper practical limit is about 50 mils average diameter. The preferred size does not exceed about 10 mils (0.010 inch) average diameter; and excellent results have been obtained with the No. 11 size of approximately 5 to 6 mils diameter; which results in a layer containing thousands of spheres per square inch. The spheres preferably should be graded so as not to depart drastically from the average size. The use of very small spheres permits of making reflex reflector sheets which are quite thin and flexible. The present type of sheet permits of using extremely small spheres, even those of less than 1 mil diameter; and reflex reflector sheeting having a total thickness substantially less than 5 mils can be fabricated as a practical matter. The use of minute spheres also makes it possible to employ spheres made from compositions which do not provide sufficient transparency or clearness when formed into large spheres; light absorption being proportional to sphere diameter.

The layer of small spheres results in an apparent merging of the reflected rays coming from the individual spheres, as even at close range an observer's eyes cannot resolve the individual rays. Thus a uniform reflection over the total area is produced. In the case of a sign, the reflux reflecting areas appear as though formed of brilliant paint when viewed by reflex reflection at night. Day viewing by diffused sunlight likewise does not reveal the beaded nature of the internal structure. If the back reflector is a sign surface, the sign will be visible by day as though the overlying structure were not present, the latter acting as a transparent sheet due to the small size of the spheres.

The back reflector 10 may be omitted to produce an optical sheet consisting of the elements 11, 12, 13 and 14; the back face thereof being the back surface of the transparent spacing film 11. In making such a sheet material, the overlying structure may be built up on a transparent preformed film constituting the back spacing film 11; or the spacing film may be cast on a base or sheet from which it can be subsequently stripped, followed by building up the remaining structure thereon and ultimately stripping the finished sheet from the casting support. This sub-combination has utility itself as an article of manufacture and sale. It may be furnished in convenient sheet or roll form to printers and sign makers for application by them to the surfaces of signs and markers made by them, for imparting a reflex reflecting action thereto. Such optical sheet material may be laminated to the desired base surface in various ways, as by using a thin transparent cement. By employing a spacing film which is thermo-adhesive, the sheet may be readily bonded by use of heat. By employing a pressure-sensitive adhesive type of spacing film, the sheet may be bonded by mere pressing.

Fig. 2 illustrates a structure like that shown in Fig. 1 (and hence reference numerals 10 to 14 refer to the same elements, which have previously been discussed), but having a transparent top sheet 15 laminated to the flat front face of the transparent covering 14 which overlies the layer of spheres. In a broad sense, this structure may be regarded as having a flat-front covering for the layer of spheres which is formed in two parts (i. e. layers 14 and 15 together constitute a transparent covering having a flat front face). This construction has the advantage of making it easier to provide a relatively thick total covering for the spheres.

The top sheet 15 may have the same refractive index as the covering layer 14, in which case the optical effect is equivalent to that of increasing the thickness of the covering layer 14 in the Fig. 1 structure. However, top layer 15 may have a different refractive index, either less than or greater than the refractive index of the underlying covering layer 14. This will not affect the refracting action of the spheres. Nor will there be any alteration in the angle with which angularly incident light rays strike the underlying spheres, for they will merely be bent in two steps instead of one step in passing from the atmosphere to the spheres, the end result on angle being the same as though the top sheet 15 was not present.

Top sheet 15 may be formed by casting a suitable coating on the front surface of the covering layer 14, or it may be a preformed film or sheet attached to the convering layer 14. The covering layer 14 may thus be chosen with particular reference to its ability to bond to the spheres, and to its refractive index relative to that of the spheres; whereas these are not factors in selecting the top sheet 15, and the latter may be chosen with particular reference to its weatherproofness, and to providing a surface especially adapted to receive printing or painting in the making of signs, etc. In making certain products, such as relatively small sized signals or markers, it may be considered desirable to employ a stiff or relatively stiff top sheet 15 which provides an exceptionally hard and weatherproof exterior, as by using a pane of glass. When a glass sheet is used it may be of the laminated so-called "shatterproof" type for increased strength and durability.

Reflex reflector sheet material having the Fig. 2 structure is well adapted for use in making outdoor advertising signs of the billboard or poster types (i. e. which are frequently changed). This sheet material can be permanently mounted on the sign base to form a total reflex reflecting area of any desired size, the flat front face of the top sheet 15 facing in a direction to receive headlight illumination of automobiles proceeding along a street or highway. The back reflector 10 is chosen so as to produce high visibility, such as a white paint or aluminum paint type, and the layers of the overlying structure are uncolored. The flat front face may be provided with desired lettering, symbols, designs, etc., by affixing thereto transparent colored films cut to the required shapes, or by painting with transparent colored paint; thereby forming an overlying transparent colored film or coating 16 indicated in Fig. 2, which acts as a colored light filter and causes reflex reflection of colored light from the areas formed thereof, contrasting with the white or silvery reflection from the free areas. Any number of colors can thus be readily employed to make up beautiful colored signs which have great "liveness" and long range visibility due to the reflex reflection both from colored and uncolored areas. These areas appear at night as though covered with brilliant paint, due to the large number of small spheres per square inch which prevents the observer's eyes from distinguishing between the light rays emanating from individual spheres. The sign is also clearly visible by day. Opaque films or coatings can be used, such areas being visible at night by contrast with surrounding reflex reflecting areas. Thus black (opaque) lettering will appear black and be visible both by day and night. Transparent uncolored film sheeting may if desired be used to cover over the sign so as to provide further protection from the weather.

No attempt will be made to describe all of the various possibilities in sign making along these lines.

By proper choice of transparent top sheet and paint, the paint can be removed when desired by use of a suitable solvent or paint remover, without damaging the top sheet of the reflex reflector sheet, and the latter can then be repainted to make a different sign. Likewise colored transparency films can be stripped off and replaced in changing the sign. The reflex reflector sheet remains in place as a permanent part of the sign. Another expedient to facilitate sign changing, is to employ poster sheets in the form of transparent film sheeting which are printed to provide the desired lettering and design, etc., and which are removably affixed to the front face of the transparent top sheet 15.

Utility for such sign making uses is an important feature of the present type of reflex reflector sheet.

Fig. 3 illustrates a structure which is broadly similar in optical structure to that shown in Fig. 1, but is made by an inverse or up-side-down procedure. This structure can be made by starting with a transparent sheet or film which constitutes the flat-faced transparent front covering 17 of the final product. With its front face down, the back surface (which is now up) is coated with a composition adapted to form a transparent binder coating 18 in which the layer of small transparent spheres 19 is partially embedded and pressed so as to contact or closely approach the surface of the covering 17, followed by drying or setting-up to harden the binder. A coating composition is then applied in excess over the layer of spheres which, upon hardening, constitutes the transparent spacing coating 20. The thickness of this coating at the back of the spheres determines the spacing distance. The spheres should preferably be graded so as to be very close to the same size, as otherwise the larger spheres will be seriously under-spaced relative to the smaller spheres. The resultant optical sheet can be provided with a back reflector 21 of any desired type, as has previously been discussed in connection with the Fig. 1 structure.

Fig. 4 illustrates a distinctively different species of the invention. A base or backing 22, serving as a support, which may be rigid or flexible as desired, is coated on the front side with a pigmented reflective binder 23 in which is partially embedded a layer of small transparent spheres 24 of high refractive index, each sphere having a preformed transparent concentric coating 25 of lower refractive index. The outer surface of this coating is a sphere surface and contacts the reflective binder to the extent that it is embedded, and is bonded thereto. A transparent covering 26 is applied over the spheres and bonds to the coatings thereon and to the intervening surfaces of the reflective binder; and has a flat front face.

The sphere coatings 25 and top covering 26 have the same refractive index, so that the spheres 24 are surrounded and overlaid by media which is optically homogeneous, and hence parallel incident light rays will not converge before striking each sphere. The spheres have a refractive index at least 1.15 times as great as such media and hence will have the same refracting lens action described in connection with the Fig. 1 structure. The back reflector in this case is the front surface of the reflective binder 23 where it contacts the back surfaces of the sphere coatings 25. Thus each sphere of high refractive index has a back reflector which is spaced from its back surface and is concentric therewith; each back reflector thus presenting a concave spherical reflective surface. The thickness of the coating 25 on each sphere is determined by the principles previously described in connection with the flat back reflector structure of Fig. 1. See in Fig. 4 the paraxial bundle of rays c incident at zero angle and brought to "focus" on the surface of the reflective binder. The sphere coatings 25 and the transparent covering 26 need not have identical refractive indices, in which case the incident rays will be refracted on entering the spherical front surface of coating 25. Such variation will modify the optimum thickness of coating 25.

This type of structure has the advantage that angularly incident rays are reflected from a back reflector surface which is spaced the same distance from the center of the sphere as is the back reflector surface struck by normally incident rays (zero angle of incidence); due to the reflective surface behind each refracting sphere being concave and concentric therewith rather than flat. The effective spacing distance remains the same as the angle of incidence increases, so that there is no drop-off in reflex reflecting brilliancy. A reflex reflector of this type has a better angularity characteristic than do types in which the back reflector surface is flat.

Fig. 5 illustrates a structure of the same general optical type, but in which there is no spacing away of the reflective surface. The base or backing 27 is coated with a pigmented reflective binder 28 in which a layer of small transparent spheres 29 is partially embedded. In this case the spheres are uncoated and directly contact the reflective binder. A transparent covering 30 is applied over the layer of spheres and bonds to the front surfaces thereof and to the intervening surfaces of the reflective binder.

The back reflective surface for each sphere is the concave surface of the reflective binder in direct contact with the back surface of the sphere. Paraxial rays d are shown striking the front face of the covering with zero angle of incidence, and being refracted by the sphere so as to converge to a "point" at the back of the sphere. The optimum ratio of refractive index of the sphere to the refractive index of the covering is that which requires a zero optimum spacing distance (i. e. no spacing), according to the principles previously discussed. This ratio value is approximately 1.90. However, refractive index values somewhat lower or higher can be used to secure brilliant reflex reflection. The value should be in the range of about 1.6 to 2.0 for high brilliancy.

As in the case of the Fig. 4 structure, a greatly improved angularity characteristic is secured as compared with use of flat back reflectors. For some purposes, brilliancy at quite large angles of incidence is a prime consideration in the design of a reflex reflector. In such cases the use of a concave back reflector type of structure may be useful even though the refractive index ratio is considerably less than the optimum value for maximum brilliancy. That is, the use of particular spheres and top covering, chosen for certain practical reasons, may not result in a refractive index ratio as high as the optimum value, and yet a reflex reflector can be made which will be quite useful for some purposes. The greatest brilliancy for all angles of incidence will of course be obtained by employing a refractive index value which approximates the optimum.

Fig. 6 illustrates a reflex reflector structure which by day appears to be continuously coated with paint of one color and by night reflex reflection appears to be continuously coated with a brilliant paint of a different color. The structure illustrated is similar to that shown in Fig. 1, except that an opaque barrier coating is located between the sides of the spheres, overlying the back reflector, the front surface of which is visible by diffuse daylight and determines the day appearance, whereas the night reflex reflection appearance is determined by the back reflector.

The back reflector 31 is covered by a transparent spacing film 32 (as in the Fig. 1 structure and the same discussion applies), which in turn is covered by a thin transparent binder coating 33 in which the layer of small transparent spheres 34 is partially embedded, the thickness of this transparent binder coating being such that it does not extend up as far as the mid-circumference of the spheres. Overlying the transparent binder coating is the pigmented opaque barrier coating 35, located between the sides of the spheres and being of such thickness that the front extremities of the spheres extend beyond it and are not covered by it. The transparent covering 36, having a flat front face, overlies and is bonded to the front surfaces of the spheres and the intervening barrier coating.

The interposed opaque barrier coating at the sides of the spheres leaves a clear optical aperture at the front and back of each sphere so as not to interfere with reflex reflection of incident light rays directed toward the front extremity of each sphere; and the optical action in respect thereto is essentially the same as was discussed in connection with Fig. 1. The normally incident paraxial rays e are shown passing through a sphere and converging to a "focus" on the back reflector (like the rays a shown in Fig. 1). Similarly, angularly incident rays are brought to a focus on the back reflector in the same way as is illustrated by rays b in Fig. 1.

However, incident light rays impinging between the front sphere extremities are prevented from penetrating to the back reflector by the interposed opaque barrier coating 35, as illustrated by ray f. If the barrier coating is primarily light-absorptive, such rays will be largely absorbed and a dark day appearance results (thus a black barrier coating will appear black because of light absorption). A reflective type of barrier coating will cause reflection of light having a color corresponding thereto.

The back reflector can be omitted so as to provide an optical sheet which is per se an article of manufacture, adapted to be laminated at any subsequent time to any desired reflective backing or base. This sheet when viewed by diffused daylight appears to be opaque and uniformly coated with the barrier coating material.

The reason why the day appearance of the Fig. 6 type of reflex reflector is determined by the barrier coating 35, while the night reflex reflection appearance is determined by the back reflector 31, and in each case the whole area appears to be continuously covered with a paint, is as follows: The large number of small spheres per square inch prevents the observer's eyes from resolving the rays coming from the individual spheres and from individual areas of the barrier coating located between spheres. The reflector sheet appears to have a continuous structure, because of the small magnitude of the actual discontinuities. When the sheet is viewed by diffused daylight, only a small proportion of those rays which impinge on the spheres are going in the right direction to be reflexively reflected from the back reflector so as to reach the observer's eyes (i. e. only those rays which are incident in paths close to the observer's line of sight). A much larger proportion of the incident rays are visibly affected by the front surface of the barrier coating (being absorbed or reflected as the case may be). The relatively few rays reaching the observer's eyes from the back reflector (by reflex reflection) are "drowned out" by the effect on the observer's eyes of the front surfaces of the barrier coating. The illusion is thereby created that the reflector sheet is continuously coated with a paint having the color of the barrier coating. But when viewed under night reflex reflection conditions (as by an occupant of an approaching automobile whose headlights illuminate the reflector sheet), the illuminating light rays are incident in substantially the same direction as the observer's line of sight, and a large proportion of the observed reflected rays will have been reflected from the back reflector. Even in the case where the barrier coating is reflective, only a small proportion of the observed rays will have been reflected from the barrier coating, since most of the rays emitted therefrom will go off at angles such that they do not return toward the observer. Hence the effect of the barrier coating will now be "drowned out" by the rays from the back reflector and the illusion is created that the reflector sheet is continuously coated with a brilliant paint having the color of the back reflector.

As an example, consider the case in which the back reflector is an aluminum paint, while the barrier coating is a black paint. The reflector sheet will appear by day to be uniformly black over its whole area; but by night reflex reflection it will appear to be uniformly silver over its whole area. Or suppose the barrier coating is an orange paint, then the sheet will appear as though painted orange by day but silver at night.

Fig. 7 illustrates a reflex reflector structure which also has a differential day-night appearance, produced however by employing a colored transparent coating instead of the opaque barrier coating used in the Fig. 6 structure. The back reflector 40 is covered by transparent spacing film 41, which in turn is covered by a thin transparent binder coating 42 in which the layer of small transparent spheres 43 is partially embedded. Overlying the binder coating is the colored transparent coating 44, located between the sides of the spheres, the front extremities of the spheres extending beyond it. A dye or transparent pigment may be used for coloring this coating material. The transparent covering 45, having a flat front face, overlies and is bonded to the front surfaces of the spheres and the intervening colored coating. In this case incident light rays which impinge between the spheres will penetrate the colored coating 44 and strike the back reflector 40, as illustrated by ray $g$, and the emitted reflected light will be differently colored on account of the color-filter action of the colored coating. For example if coating 44 is red and the back reflector 40 is silvery, the reflector sheet will appear red by day but silvery at night by reflex reflection.

The basic principle may be embodied in structures other than those illustrated in Figs. 6 and 7. The principle involved in all such embodiments is that of employing coloring material located between but not covering the small spheres which differs in color-imparting properties from the underlying reflective means which is in optical connection with the back extremities of the spheres; so as to cause the front of the reflector sheet to simulate a continuous painted appearance when viewed by day which is different from the appearance when viewed by night reflex reflection.

Reflex reflector sheets having such variations between day and night appearance can be used in making advertising signs which attract particular interest because of the "magical" change in appearance; and have many other uses where a difference between day and night appearance is desired.

Fig. 8 shows in diagram form a reflex reflector 50 (which may have any of the described types of structure) and illustrates the concentrated cone of reflex-reflected light returning toward the source of an angularly incident ray or beam which produces it.

All of the structures shown in Figs. 1 to 7 can be embodied in self-sustaining, tough, pliable film types of sheet material which are waterproof and weatherproof. There are now available a variety of organic film-forming materials and compositions which are transparent and waterproof, and many of which are highly weatherproof, which can be used in manufacturing flexible reflex reflector sheet structures; and such sheets can be fabricated in long lengths suitable for supplying in roll form, and can be readily cut into any desired shapes. Such sheet material may, if desired, be provided with a suitable adhesive coating on the back to facilitate subsequent bonding to base surfaces by users.

Reflex reflecting film sheeting having a flat front face may be made up so as to have the strength and glossy appearance of artificial leather, whether mounted on a cloth or other support, or used without a support. Such sheet material has many uses besides the making of highway signs and markers. As a novelty material, it can be used in the making of women's handbags, shoes and hats, for example, to produce unusual appearance effects (especially if a Fig. 6 or 7 type of structure is employed such that the appearance changes depending on the nature of the illumination). A further novelty use is in costumes and scenic effects employed in theatrical productions, various effects being obtained by varying the type of illumination.

Jackets and raincoats can be made which are in any case attractive in appearance, and have the special feature of making the wearer highly visible at night to motorists when he is crossing or walking along a street or highway. The day appearance may be made inconspicuous by employing a Fig. 6 structure in which the barrier coating is black or olive-green, for example, whereas the back reflector is white or silvery for brilliant reflex reflection, or is brightly colored. Traffic police would find such a raincoat of great value on rainy nights. Likewise outer belts made of or faced with such material can be employed to increase safety. A further example is to fasten a disk (or other shape) of the material to the front and to the back of a jacket or coat for improved night visibility. The day appearance can be made to blend with the color of the jacket or coat so as to be inconspicuous. Such expedients illustrate ways by which children can be made safer when on streets or highways at night.

The reflex reflective sheet material of the present invention has the feature of having a flat front which renders it more suitable for such uses, the spheres being sealed in and there being a continuous smooth outer surface. Rain does not "black out" the reflex reflection brilliancy since the lenticular refracting elements are not exposed, and the incident and reflected light can penetrate films of water on the smooth outer surface. Raindrops striking the surface only momentarily interfere, and at any instant the interference is limited to scattered minute areas. This feature is of great value in all outdoor uses, and makes possible signs and markers of greatly superior visibility on rainy nights. A further example illustrating this feature is the use of the present type of reflex reflector sheet for providing reflective surfaces on buoys, which are splashed with water in stormy weather as well as being exposed to rain.

The effect of water droplets on the outer surface can be additionally minimized by including a wetting agent in the front surface covering or layer, so that water droplets will promptly flow out to a film. Another expedient is to provide a hydrophobic outer surface highly repellent to water (non-wettable) so that rain drops or spray will quickly roll off from the smooth surface.

The following further features of the present type of reflex reflector sheet having a flat or smooth (non-lenticular) front surface are worthy of emphasis. This type accumulates less dirt on its surface and may be easily cleaned by washing, wiping or buffing. In contrast, a lenticular or beaded surface accumulates dirt in the depressions between the sphere extremities and the accumulated dirt is hard to remove. The present type permits of making a very thin film sheet having a smooth, glossy surface, which when bonded to a base surface is substantially flush and matches well with adjacent painted or lacquered surfaces. Such a reflex reflector sheet may be bonded to the back of the body of highway vehicles and railway cars without detracting from the general appearance thereof, and it can be washed off and polished to maintain a clean glossy surface. By using the Fig. 6 type of structure, or the like, the normal or day appearance can be made the same as that of the surrounding area of the body (black, for example), without interfering with the distinctive and brilliant night appearance (white or red, for example) when viewed by a motorist or locomotive engineer approaching from the rear. These features encourage the use of such sheeting for providing large-area warning markers on the backs of highway vehicles and railway cars, and thereby improving safety conditions at night. These same features are of value in making signs where only a part of the area is covered by a reflex reflector sheet; and the entire sign surface can be painted over with a transparent lacquer and this will not interfere with the optical action of the flat-surfaced reflex reflector area.

Moreover, in making signs, the flat and smooth surface of the present type of reflector sheet can be more readily printed, painted and screen processed. Half-tone printing can be employed when desired. A flat or smooth (non-lenticular) surface is easier to draw and paint on. If a mistake is made, the painter can easily wipe the surface clean again with a rag moistened with a suitable solvent, and start over; but this is next to impossible with beaded type surfaces and the smaller the spheres the greater the difficulty. Painting, printing and screen-processing with transparent colored paints and inks is possible, the thus coated areas having a color filter action and not preventing proper functioning of the underlying reflex reflecting optical structure, due to the flat surface of the coated areas; whereas such coatings applied to a beaded or lenticular type of surface would largely or entirely prevent reflex reflection and the smaller the spheres the greater the difficulty.

*Example 1*

This example illustrates the making of a thin and flexible, weatherproof reflex reflector sheeting having the type of structure indicated in Fig. 1, the back reflector being a pigmented film coating. The reflector sheet is built up by a casting technique on a coated paper carrier sheet which can be removed and reused, or can be left in place as a removable liner which can be stripped off dry whenever desired (as distinguished from liners which must be moistened to be readily removed). The method can be used for making continuous sheeting of long length suitable for supplying in roll form.

The carrier web is first prepared from a highly calendered hard-surfaced paper (such as a 70 lb. per ream Fourdrinier paper), by roll coating on one side with the following solution in the amount of about 13–15 grains per 24 sq. in.:

| | Parts by weight |
|---|---|
| Heavy blown castor oil | 100 |
| "Beetle No. 227–8" (50% solids) | 200 |
| Curing catalyst solution | 1 |

The "Beetle No. 227–8" is a 50% solution of thermo-setting urea-formaldehyde resin in a volatile solvent composed of 60 parts butyl alcohol and 40 parts xylol, sold by American Cyanamid Co. The blown castor oil serves as a plasticizer. The catalyst solution is a 50% solution of sesqui-methyl-phosphate in "Ethyl Cellosolve" (ethyleneglycol-monoethylether). This surface coating may be dried and cured by passing the sheeting through ovens, subjecting it to 140° F. for 15 minutes and then to 190° F. for 30 minutes. The coating adheres tenaciously to the paper and provides a smooth surface adapted to receive the reflector film coating. This surface coating for the carrier web is chosen with reference to the composition of the reflector film coating so that when the latter is applied in solution form it will have a good wetting action and initial adhesion to the carrier web surface, but will adhere poorly enough on completion of drying or curing so as to permit of stripping apart when subsequently desired.

The following reflector film coating composition may be used to provide a flexible, waterproof, back reflector 10 which is removably adhered to the carrier web. The solution is knike-coated on the coated carrier web surface in the amount of 25–30 grains per 24 sq. in.

| | |
|---|---|
| Titanium dioxide pigment | 35 |
| N-butyl-methacrylate polymer resin | 16 |
| Iso-butyl-methacrylate polymer resin | 16 |
| Xylol (volatile solvent) | 33 |

The titanium dioxide is a white pigment, but it will be understood that colored pigments can be used for producing colored reflection (for example lead chromate pigment can be used for making a yellow reflector sheet). The pigment is milled into the resin solution using a roll type of paint mill. The polymer resins are already fully polymerized or cured and setting-up of the coating merely involves evaporation of the solvent, which may be done by heating the coated sheeting for 20–30 minutes at 140° F. and then for 30–45 minutes at 190° F.

The integral transparent spacing film 11 is next formed by roll-coating the reflector film surface with the following solution in amount to produce a dried film of the desired thickness relative to the diameter of the spheres to be used.

| | |
|---|---|
| N-butyl-methacrylate polymer resin | 45 |
| Xylol (volatile solvent) | 55 |

In this particular example a solution coating weight of 8–10 grains per 24 sq. in. is employed to produce a dried film having a thickness of approximately 0.82–0.86 mil, the refractive index being approximately 1.48. Drying is effected by heating for 25–30 minutes at 140° F. and then for 30–45 minutes at 190° F.

The integral transparent binder-coating 12 is next formed by roll-coating the spacing film surface with the same n-butyl-methacrylate solution in sufficient amount to properly position the spheres, the amount in this example being 5–9 grains per 24 sq. in. While the coating is still wet, the glass beads are applied in excess to form the light-returning layer of spheres 13, the beads sinking down in the wet coating until they touch, or closely approach, the surface of the spacing film. Positioning of the beads can be facilitated by passing the web over a batter. The web may then be passed down around a roller to cause excess beads to fall off. The web is then heated for 20–30 minutes at 140° F. and for 20–30 minutes at 190° F. to dry the binder coating. In this example lead silicate glass beads are used having a refractive index of approximately 2.04 and a diameter range of approximately 1.5–3.0 mils (No. 15 size).

The integral transparent covering 14 is next formed by roll-coating the beaded surface with the following solution in amount which will produce a dried coating that extends beyond the front extremities of the beads and provides a flat front face:

N-butyl-methacrylate polymer resin _____ 25
Iso-butyl-methacrylate polymer resin _____ 25
Xylol (volatile solvent) _____ 50

In this example a solution coating weight of 30–35 grains per 24 sq. in. is used. The coating is dried by heating the web for 25–35 minutes at 140° F. and then for 45–60 minutes at 190° F. The refractive index of the dried covering is approximately 1.48. The reflector film can be stripped from the carrier web whenever desired.

The resultant self-sustaining reflex reflector film sheeting is quite thin and flexible, yet strong, and may be supplied in roll form. It can be readily cut into pieces of desired shape. The caliper thickness is approximately 8 mils, the tensile strength is about 8 pounds per inch width, and the stretch before rupture is about 17% (these figures being for the reflector film after stripping from the carrier web). The number of glass beads per square inch exceeds 100,000.

Samples of this reflector sheeting have been exposed to weathering at Houston, Texas, being mounted vertically, facing south. This location is used by a number of companies for evaluating weather-resistance of various products because of the severe weathering cycle encountered. At the end of ten months these samples were examined and no evidence of deterioration could be observed even when carefully inspected under a microscope. Their reflex reflecting brilliancy was still the same as that of control samples which had not been exposed. Samples were also exposed at Saint Paul, Minnesota, and found to be weatherproof. Usefulness for making weatherproof outdoor signs and markers has been definitely established.

*Example 2*

This example illustrates the making of flexible and weatherproof sheeting having the type of structure indicated in Fig. 6; there being no initial back reflector, and the sheeting being suitable as stock sheeting for laminating to any desired reflective base surface and for coating, painting or printing on its back surface. The opaque barrier coating 35 is black, so that the sheeting appears opaque and as though continuously coated with black enamel (like black patent leather), when viewed by daylight or other diffused illumination, even when it is joined to a back reflector. When viewed under reflex reflecting conditions, whatever reflecting surface contacts the back of the sheeting is visible as a continuous surface just as though the overlying sheeting were in fact continuously transparent.

The same carrier web is used that has been described in Example 1. The therein described reflector film coating is omitted. The transparent spacing film 32 is cast directly upon the carrier web surface by roll-coating with the n-butyl-methacrylate solution in amount to provide the desired spacing distance. In this example, the thickness of the film is made somewhat less than the ultimate spacing distance of the beads from a reflective surface to which the sheeting may be bonded, in order to allow for the spacing effect of the laminating adhesive which may be employed. Thus the spacing film provides only a part of the ultimate spacing distance. The coating solution weight is 20–25 grains per 24 sq. in. in this particular example, and the coating is dried by heating for 15 minutes at 140° F. and then for 30 minutes at 190° F.

The transparent binder coating 33 is then formed by roll-coating with the same n-butyl-methacrylate solution, followed by applying lead silicate glass beads to form the bead layer, and then drying for 20–30 minutes at 140° F. and 20–30 minutes at 190° F. A solution coating weight of 5–9 grains per 24 sq. in. is used, and the beads have diameters in the range of approximately 3.6–4.2 mils (No. 13 size) and a refractive index of approximately 2.07.

The beaded surface is then roll-coated with a black coating composition having the following formula, in the amount of 4–6 grains per 24 sq. in.:

N-butyl-methacrylate polymer resin _____ 30
Carbon black pigment _____ 4
Xylol (volatile solvent) _____ 66

The black coating is dried for 20–30 minutes at 140° F. and 20–30 minutes at 190° F. The surface is then scrubbed by mechanical means (such as by using a hog bristle or nylon bristle brush), using water as a lubricant, to remove the black coating from the front extremities of the beads. This results in the black coating lying only between the sides of the beads to provide a black opaque barrier coating 35.

The transparent covering 36 is then applied, using the formulation and procedure described in Example 1.

The resultant sheeting may then be stripped from the carrier web, ready for attaching to any desired surface. In this example this will be illustrated by the lamination of the sheeting to aluminum foil which thus constitutes a back reflector 31, resulting in an integral flexible reflex reflector sheet which appears black by day, but silvery when viewed under reflex reflecting conditions.

The laminating adhesive solution is made as follows:

Methyl acrylate (monomer) _____ 75
Isobutyl acrylate (monomer) _____ 25
Diamyl-ethylene - dimaleate (interpolymer cross-linking agent) _____ 0.39
Benzoyl peroxide (polymerization catalyst) _ 0.50
Amyl acetate (volatile solvent) _____ 300

The adhesive compounding reaction is conducted in a glass-lined Pfaudler kettle equipped with an agitator, reflux condenser, and means for heating and cooling. The above materials are charged into the vessel and an inert atmosphere (carbon dioxide or nitrogen) is introduced. Heat the solution to 130–140° F. When the reaction starts, as shown by increase of temperature (the reaction being exothermic), apply cooling means and hold the temperature to not over 140° F. Maintain this temperature until a removed sample, heated in an open dish for three hours at 221° F., shows retention of at least 90% of the original acrylates as non-volatile polymers (the monomers being volatile and evaporated off with the solvent in this test). Then cool to room temperature and repeat the test, which should now show a 92–95% retention of acrylates (i. e. 92–25% by weight of the acrylate monomers has become polymerized to non-volatile form).

The aluminum is roll-coated with 5–7 grains per 24 sq. in. of the adhesive solution and is then heated for 10 minutes at 140° F. and for 60 minutes at 220° F. to dry the coating. This provides a transparent adhesive coating adapted to laminate to the bank surface of the beaded sheeting. The foil and beaded sheeting can be smoothly and firmly bonded together by running through a pair of squeeze rolls. The total spacing distance (from back extremities of beads to the surface of the foil) is about 1.3 mils.

*Example 3*

This example illustrates the making of flexible and weatherproof sheeting having the type of structure indicated in Figure 3, except that the back reflector has been omitted, and the backside of the sheeting is provided with a heat-activatable transparent adhesive so that the sheeting will be suitable as stock sheeting for directly laminating to any desired reflective base surface. The sheeting is transparent and does not interfere with the day appearance of sign surfaces to which applied.

The same carrier web is used as has been described in Example 1. From there on, the entire procedure for constructing the film is reversed in that the top coat resin is applied directly to the carrier web surface. The flat transparent covering of the sheeting 17 is obtained by roll coating the same n-butyl-methacrylate polymer solution as is described for the spacing and binder coatings of Example 1. In this case, 13 to 15 grains per 24 square inch is used. The coating is dried for 20 to 30 minutes at 140° F. followed by an additional 30 to 40 minutes at 180 to 200° F.

The integral transparent binder coating 18 is next formed by roll coating the transparent covering surface with 6 to 9 grains per 24 square inch of the following resin solution:

N-butyl-methacrylate polymer resin _____ 45
Methyacrylate-isobutylacrylate solution polymer (described as the laminating adhesive solution in Example 2) _____ 33
Xylol (volatile solvent) _____ 55

Lead silicate glass beads are then applied followed by a drying period of 20 to 25 minutes at 140° F. and 30 to 40 minutes at 180 to 200° F. In this case the beads have the same size (No. 13) and refractive index as described in Example 2.

The integral transparent spacing film 20 is next formed by roll coating the beaded surface with the same resin solution as the transparent binder coating described above. A solution coating weight of 15 to 18 grains per 24 square inch is used, followed by a drying period of 20 to 30 minutes at 140° F. and 60 to 90 minutes at 200 to 220° F.

The adhesive solution is next applied to the transparent spacing layer. The resin solution used in this is the methacrylate-isobutylacrylate copolymer solution described as the laminating adhesive solution in Example 2. A solution coating weight of 12 to 14 grains per 24 square inch is roll coated, and then dried for 40 to 50 minutes at 140° F. and 30 to 40 minutes at 200 to 220° F. The resultant transparent adhesive layer provides part of the total spacing between the back extremities of the beads and the reflective surface to which the sheet is ultimately bonded.

To facilitate easy unwinding of this sheeting, following storage in roll form for long periods of time, the sheet material is wound together with a 1 mil thick Cellophane liner. This liner can be easily removed from the sheeting when desired by wetting the Cellophane with water.

The sheeting can be laminated to any desired reflective base by removing the Cellophane from the adhesive surface and heat sealing the sheeting to the reflective surface. Application is best made by rolling out the sheeting onto the reflector surface at room temperature using squeeze rolls or a hand roller and taking care to avoid any trapped air. The sheeting can be firmly bonded to the reflector surface by heating under mild pressure to 212 to 250° F.

Having described various embodiments of our invention, for purposes of illustration rather than limitation, what we claim is as follows:

1. A reflex light reflector comprising a light-returning layer of small transparent spheres, internal light-reflecting means underlying said spheres and positioned in optical connection with the back extremities thereof so as to produce reflex reflection, and a continuous overlying transparent solid covering united and conforming to the front extremities of said spheres and having at flat front face; said spheres having a refractive index at least 1.15 times that of said transparent covering.

2. A reflex light reflector according to claim 1, wherein said spheres have an average diameter not exceeding about 10 mils.

3. A reflex light reflector according to claim 1, wherein said spheres have a refractive index in the range of about 1.3–2.0 times that of said transparent covering.

4. A reflux light reflector comprising a light-returning layer of small transparent spheres, internal light-reflecting means underlying said spheres and positioned in optical connection with the back extremities thereof so as to produce reflex reflection, and a continuous overlying transparent solid covering united and conforming to the front extremities of said spheres and having a flat front face; said spheres having a refractive index at least 1.15 times that of said transparent covering; and a transparent color film or coating attached to at least a portion of the flat front face of said overlying transparent covering to produce coloration of reflected light thereat.

5. A reflex light reflector comprising a light-returning layer formed of a large number of contiguous small transparent spheres, internal light-reflecting means underlying said spheres and positioned in optical connection with the back extremities thereof so as to produce reflex reflection of a beam of light passing through the spheres, coloring material located between but not covering said spheres and differing in color-imparting properties from said underlying light-reflecting means so as to cause the front of the reflector to simulate a continuous painted appearance when viewed by day which is different from the appearance when viewed by night reflex reflection; and a continuous overlying transparent solid covering united and conforming to the front extremities of said spheres and having a flat front face; said spheres having a refractive index at least 1.15 times that of said transparent covering.

6. A reflex light reflector according to claim 5, wherein said coloring material located between said spheres is predominately light-absorptive so as to cause a dark colored day appearance, and said underlying light-reflecting means produces a contrastingly brilliant reflex reflection at light.

7. A reflex light reflector comprising a back reflector, an overlying transparent matrix, a light-returning layer of small transparent spheres embedded in the transparent matrix so as to be spaced from the back reflector, the spacing distance being such as to substantially increase reflex-reflection brilliancy as compared with no spacing, and a continuous overlying transparent solid covering united and conforming to the front extremities of said spheres and having a flat front face; said spheres having a refractive index at least 1.15 times that of said transparent covering.

8. A reflex light reflector comprising a flat back reflector, an overlying transparent spacing layer, a light-returning layer of small transparent spheres whose back extremities substantially contact said spacing layer and are in optical connection with the back reflector, the spacing distance being such as to substantially increase reflex-reflection brilliancy as compared with no spacing, binder material between said spheres, and a continuous overlying transparent solid covering united and conforming to the front extremities of said spheres and having a flat front face; said spheres having a refractive index at least 1.15 times that of said transparent covering.

9. A reflex light reflector according to claim 8, wherein said spheres have an average diameter not exceeding about 10 mils.

10. A reflex light reflector according to claim 8, wherein said spheres have a refractive index at least about 1.3 times that of said transparent covering and that of said transparent spacing layer.

11. A reflex light reflector comprising a reflective binder layer, a light-returning layer of small transparent spheres partially embedded in the reflective binder layer, and a continuous overlying transparent solid covering united and conforming to the front extremities of said spheres and having a flat front face; said spheres having a refractive index in the range of about 1.6–2.0 times that of said transparent covering.

12. An optical sheet adapted to be associated with and produce reflex light reflection from a reflecting surface, including a light-returning layer formed of a large number of contiguous small transparent spheres whose back extremities are optically exposed for rearward passage of light rays, and a continuous overlying transparent solid covering united and conforming to the front extremities of said spheres and having a flat front face; said spheres having a refractive index at least 1.15 times that of said transparent covering.

13. An optical sheet according to claim 12, wherein said spheres have an average diameter not exceeding about 10 mils.

14. An optical sheet according to claim 12, wherein said spheres have a refractive index in the range of about 1.3–2.0 times that of said transparent covering.

15. An optical sheet adapted to be associated with and produce reflex light reflection from a reflecting surface, including a light-returning layer formed of a large number of contiguous small transparent spheres whose back extremities are optically exposed for rearward passage of light rays, coloring material located between but not covering said spheres so as to cause the front of the sheet to simulate a continuous painted appearance when viewed by day; and a continuous overlying transparent solid covering united and conforming to the front extremities of said spheres and having a flat front face; said spheres having a refractive index at least 1.15 times that of said transparent covering.

16. An optical sheet according to claim 15, wherein said coloring material located between said spheres is predominately light-absorptive so as to cause a dark colored day appearance.

17. An optical sheet comprising a transparent sheet matrix having a flat back, a light-returning layer of small transparent spheres embedded in the transparent matrix so as to be spaced from the back thereof by a distance not exceeding the order of the average sphere diameter, and a continuous overlying transparent solid covering united and conforming to the front extremities of said spheres and having a flat front face; said spheres having a refractive index at least 1.15 times that of said covering.

18. An optical sheet having flat front and back faces, a light-returning layer of small transparent spheres embedded within the sheet so as to be spaced from the faces thereof, coloring material located between but not covering said spheres so as to control the appearance of the sheet when viewed by diffused light; said sheet being transparent in front of and behind said spheres; and said spheres having a refractive index of at least 1.15 times that of the sheet material which covers the front extremities thereof.

19. A self-sustaining flexible reflex light reflector sheet including a light-returning layer formed of a large number of contiguous small transparent spheres, internal light-reflecting means underlying said spheres and positioned in optical connection with the back extremities thereof so as to produce reflex reflection, and a flexible continuous overlying transparent solid covering united and conforming to the front extremities of said spheres and having a flat front face; said spheres having a refractive index at least 1.15 times that of said transparent covering.

20. A reflex light reflector sheet according to claim 19, wherein said spheres have an average diameter not exceeding about 10 mils.

21. A reflex light reflector sheet according to claim 19, wherein said spheres have a refractive index of about 1.3–2.0 times that of said transparent covering.

22. A flexible reflex light reflector sheet which is weatherproof and adapted for outdoor use, comprising a self-sustaining flexible waterproof film structure having a flat front face and having a flexible back reflector combined to the other face, and a layer of contiguous transparent spheres having an average diameter not exceeding about 10 mils embedded and sealed within the film structure so as to underlie the flat front face thereof and overlie the back reflector in spaced relation, said film structure being transparent in front of and behind said spheres to permit an incident beam of light to be reflected from said back reflector; said spheres having a refractive index at least 1.15 times that of the film structure in front of and behind the spheres and being spaced from said back reflector so as to substantially increase reflex-reflection brilliancy as compared with no spacing.

23. A flexible reflex light reflector sheet which is weatherproof and adapted for outdoor use, comprising a self-sustaining flexible waterproof film structure having a flat front face and having a flexible back reflector combined to the other face, a layer of contiguous transparent spheres having an average diameter not exceeding about 10 mils embedded and sealed within the film structure so as to underlie the flat front face thereof and overlie the back reflector in spaced relation, coloring material located between but not covering said spheres and differing in color-imparting properties from said back reflector so as to cause the front of the reflector sheet to simulate a continuous painted appearance when viewed by day which is different from the appearance when viewed by night reflex reflection; said film structure being transparent in front of and behind said spheres to permit an incident beam of light to be reflected from said back reflector; said spheres having a refractive index at least 1.15 times that of the film structure in front of and behind the spheres and being spaced from said back reflector so as to substantially increase reflex-reflection brilliancy as compared with no spacing.

24. A flexible reflex light reflector sheet which is weatherproof and adapted for outdoor use, comprising a self-sustaining flexible waterproof film structure having a flat front face and having a flexible back reflector combined to the other face, a layer of contiguous transparent spheres having an average diameter not exceeding about 10 mils embedded and sealed within the film structure so as to underlie the flat front face thereof and overlie the back reflector in spaced relation, an opaque barrier coating located between but not covering said spheres and differing in color-imparting properties from said back reflector so as to cause the front of the reflector sheet to simulate a continuous painted appearance when viewed by day which is different from the appearance when viewed by night reflex reflection; said film structure being transparent in front of and behind said spheres to permit an incident beam of light to be reflected from said back reflector; said spheres having a refractive index at least 1.15 times that of the film structure in front of and behind the spheres and being spaced from said back reflector so as to substantially increase reflex-reflection brilliancy as compared with no spacing.

PHILIP V. PALMQUIST.
BERT S. CROSS.
GEORGE P. NETHERLY.